United States Patent
Misso

(10) Patent No.: US 6,813,120 B1
(45) Date of Patent: Nov. 2, 2004

(54) ENCASED E-BLOCK

(75) Inventor: Nigel F. Misso, Bethany, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/539,005

(22) Filed: Mar. 30, 2000

Related U.S. Application Data

(60) Provisional application No. 60/133,833, filed on May 12, 1999.

(51) Int. Cl.$^7$ ............................................. G11B 17/02
(52) U.S. Cl. ................................................. 360/265.7
(58) Field of Search ........................ 360/265.7, 97.01, 360/98.01, 104, 105, 106; 369/215, 219–221, 244, 250, 218; 29/603.01

(56) References Cited

U.S. PATENT DOCUMENTS

| | | | |
|---|---|---|---|
| 3,956,080 A | 5/1976 | Hradcovski et al. | 204/56 R |
| 4,082,626 A | 4/1978 | Hradcovsky | 204/56 R |
| 4,659,440 A | 4/1987 | Hradcovsky | 204/58 |
| 5,095,396 A | 3/1992 | Putnam et al. | 360/106 |
| 5,147,515 A | 9/1992 | Hanagata et al. | 204/164 |
| 5,275,713 A | 1/1994 | Hradcovsky | 205/106 |
| 5,319,512 A * | 6/1994 | Grapenthin | 360/265.9 |
| 5,452,151 A * | 9/1995 | Money et al. | 360/75 |
| 5,475,549 A | 12/1995 | Marder | 360/104 |
| 5,523,912 A | 6/1996 | Koriyama | 360/106 |
| 5,616,229 A | 4/1997 | Samsonov et al. | 205/107 |
| 5,627,701 A | 5/1997 | Misso et al. | 360/106 |
| 5,672,435 A * | 9/1997 | Born et al. | 428/539.5 |
| 5,760,999 A | 6/1998 | Yahata | 360/98.01 |
| 5,801,905 A | 9/1998 | Schirle et al. | 360/104 |
| 5,905,606 A | 5/1999 | Johnson et al. | 360/105 |
| 6,086,953 A * | 7/2000 | Raghavan et al. | 427/255.31 |
| 6,151,198 A * | 11/2000 | Prater et al. | 360/265.7 |
| 6,245,172 B1 * | 6/2001 | Face, Jr. | 156/89.11 |
| 6,250,364 B1 * | 6/2001 | Chung et al. | 164/113 |
| 6,276,793 B1 * | 8/2001 | Kazakos et al. | 219/216 |
| 6,354,213 B1 * | 3/2002 | Jenkins | 101/483 |

FOREIGN PATENT DOCUMENTS

WO    WO 98/28467   *   7/1998

* cited by examiner

*Primary Examiner*—Robert S. Tupper
(74) *Attorney, Agent, or Firm*—Derek J. Berger

(57) ABSTRACT

A disc drive, includes a base, a disc stack rotatably attached to the base, and an actuator assembly movably attached to the base. The actuator assembly includes an E-block. The E-block for a disc drive includes a metal core and a ceramic coating on the metal core of the E-block. The ceramic coating on the metal core of the E-block is less dense than the metal core. The stiffness of the ceramic coating on the metal core of the E-block is greater than the stiffness of the metal core. In one embodiment, the E-block has a metal core of aluminum. The ceramic coating is may be formed using any method, including an electrochemical process or by depositing the ceramic coating onto the E-block.

20 Claims, 8 Drawing Sheets

ENCASED E-BLOCK

RELATED APPLICATION

This application claims the benefit of U.S. Provisional Application Ser. No. 60/133,833, filed May 12, 1999 under 35 U.S.C. 119(e).

FIELD OF THE INVENTION

The present invention relates to the field of mass storage devices. More particularly, this invention relates to an apparatus and method for producing a stiffer of the E-block or actuator assembly in a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track.

There are two basic types of actuators: linear and rotary. A linear actuator positions the head assembly linearly along a radius of the disk. A rotary actuator, functions much like the tone-arm on a record player, with the actuator positioning the head assembly along an arc over the disc surface. A rotary actuator consists of several components: an E-block assembly, one or more transducer head assemblies, and circuitry for carrying power and signals to and from the transducer head assemblies. The E-block assembly includes one or more arms attached at one end of the E-block, and a yoke which carries a voice coil attached at the other end of the E-block. The E-block also has a bore opening therein for locating a pivot cartridge to allow rotary movement of the E-block assembly. The focus of this invention is on the component referred to as an E-block assembly. The E-block assembly is also commonly referred to as a comb or comb assembly. Specifically, the invention relates to the construction and method of manufacture of E-block assemblies.

Disc drives and their various components are manufactured and marketed in a world wide market where the cost of a disc drive system and its attendant components is a critical parameter in achieving sales of the product. The cost includes factors such as the raw component material, processing (forming, packaging, handling, etc.), recycling of scrap and process wastes, product development, testing, product life, and system performance. Minimizing the cost of a disc drive and its components, such as E-block assemblies, thus encompasses a wide range of design and manufacturing issues.

The material of the component and the method of producing the component clearly has an effect on the cost of the component. Like all manufacturing decisions, the selection of material and method of manufacture requires a tradeoff of costs and advantages to obtain the desired product performance at the lowest cost possible. The parameters for selecting a material and method of manufacture for an E-block of comb assembly in a disc drive can be grouped into three main areas:

1) material and finished product performance,
2) manufacturability, and
3) life expectancy.

Product performance in the disc drive area has several constant goals. Some of the constant goals that effect disc drives include lower access times, increased data capacity and lower use of power by the disc drive. Access time is the amount of time needed to read data from the disc of the disc drive. In most instances, the three manufacturing parameters listed above are optimized to improve the access performance of the disc drive. In other instances, power consumption may be minimized for a given access performance, or access performance may be maximized for a given power consumption.

For disc drive systems, it is desired to maximize the E-block assembly stiffness and minimize the system inertia, because increased stiffness and reduced inertia result in improved access performance (i.e., faster access time and smaller power requirements). A stiffer system will respond faster, as greater stiffness minimizes "settle" time at the end of a track access to a desired target track location. The faster a system "settles", the faster the head assembly can read or write data on the disk at the target track. A low inertia allows an E-block assembly, to be moved quickly from one location to another with a minimum of power consumption. Moving a rotary actuator requires application of torque to the E-block or comb assembly. Torque can be thought of as application of a force at a distance from the axis of rotation of a body. In the instance of an E-block or comb assembly, the force is applied at a distance from the rotatory axis of a pivot cartridge within the bore of the E-block. Torque can also be expressed in terms of inertia of a body as shown in the below listed formula:

$$T = (J) \times (\alpha)$$

where

T=torque

J=inertia of the E-block or comb assembly $\alpha$=angular acceleration of the E-block or comb assembly From the above formula, it can be seen that reducing the inertia of the E-block or comb assembly results in a lower torque requirement to achieve the same angular acceleration. Lower torque also means less power consumption.

Several mechanical properties determine the stiffness and inertia of a system. These properties are material density, flexural modulus, and specific flexural modulus. A low material density is desired because a low density allows more material to be used to improve the stiffness of the E-block, while maintaining low mass (and thus low inertia). A low material density can reduce cost by eliminating the need for incorporating weight reducing holes into the product. Including weight reducing holes in an E-block requires additional manufacturing steps (such as machining of the component) which add additional costs. Further, the holes may induce air turbulence which effects the performance of the head assemblies as they "fly" over the surface of the disk.

A high flexural modulus (MPa), when combined with a low density ($kg/m^3$), produces a higher specific flexural modulus ($m^2/s^2$). Specific flexural modulus is related to the resonance frequency of a structure of a given size and shape, with a high specific flexural modulus indicating a high resonance frequency of the structure. A higher resonance frequency results in improved access performance of the E-block because the assembly may be accelerated harder without inducing resonance of the assembly. Resonance, or vibration of the assembly, increases "settle" time which, as discussed above, increases the time required before the head assemblies can read or write data to the disks.

Thermal stability of the E-block is also important in the performance of the disc drive system. As the temperature of a material changes, the material undergoes thermal distortion. In the case of an E-block, thermal distortion causes the arms of the E-block to move relative to a fixed reference point. This thermally induced movement affects the disc drive performance by altering the position of the head assemblies such that they may no longer be able to accurately read and write data to the disks. Ideally, the E-block would suffer no thermal distortion. The next best situation is to minimize the thermal distortion, and use a material that causes all the arms to return to their original positions when the thermal stress is removed. Thus, when selecting a material and method of manufacture for an E-block, the thermal stability of the material and affect of the method of manufacture on thermal distortion are important considerations.

In addition to selecting a material which optimizes the system performance, it is also desired that the component be easy to produce and have a life expectancy at least as long as the life of the assembled product. These three areas (i.e., performance, manufacturability, and life expectancy) each place specific demands on selection of material and method of manufacture. As noted above, to optimize the E-block assembly performance, the material properties relating to density, flexural modulus, specific flexural modulus, and thermal stability are important. For ease of manufacture, material properties such as ultimate strength, yield strength and tensile modulus are important, as well as the ability to assemble, bond, and machine the material. The life of the component is effected by the material's corrosion resistance and need for surface treatment, and in the case of an E-block assembly, the material's electrical conductivity. The importance of each of these factors is explained below.

An E-block assembly undergoes a significant amount of handling in transport during the manufacturing process. The component must be sufficiently strong to withstand the handling (and possible abuse) to which it is subjected. Therefore, the ultimate strength and yield strength of the material are important. Some materials used to form E-blocks may be functionally damaged in the manufacturing process without the damage being visible. For example, die cast magnesium has a very low yield strength (103 MPa), with a much higher ultimate strength (220 MPa). Thus a component made of die cast magnesium may yield (i.e., bend) a slight amount but not break. The result of a stress causing bending but not breakage is an unusable component with a defect which may not be detected until late in the manufacturing process, causing a greater manufacturing expense. To avoid this type of damage, a material with a high yield strength and an ultimate strength of essentially the same magnitude is desired. A high yield strength reduces the chance of accidental damage such as bending, while an ultimate strength close to the yield strength is more likely to produce visual evidence of damage. For example, if the yield strength and ultimate strength are equal (i.e., the material is perfectly brittle) any bending will result in a broken part which is easily detected and discarded early in the manufacturing process.

The tensile modulus of the material is important for attaching the head assemblies to the E-block support arms. Head assemblies are often attached by swaging, and it is desired that the E-block assembly material be compatible with the currently used manufacturing processes. For swaging, the material must deflect enough so that the head assembly can be plastically deflected to secure the head assembly to the support arm.

In addition to the above physical properties, it is desired that the material of the E-Block assembly be compatible with current adhesive bonding technologies. Many E-block assemblies have wires or other components bonded to the sides of each arm. The E-block assembly material must be chemically compatible with the chosen adhesives to prevent outgassing and/or corrosion which may damage the disc drive.

The interior of a disc drive is extremely sensitive to foreign materials, such as dust or other particulates. Thus, great care must be taken to ensure such debris is kept out of the disc drive. Particle generation within the disc drive may result in a catastrophic disc crash where the disc drive ceases to function. For metallic E-block assemblies, corrosion products are a significant source of particulates, and some form of surface treatment is required to prevent corrosion of the material. These surface treatments add cost to the finished product, and a product that does not require any special treatment is desirable.

The interior of a disc drive is an electrostatic generator of tremendous potential. When operating, the disks are rotating at a high speed inside a cavity full of dry (non-conducting) air. The rotation of the disks causes the air to rotate also, resulting in dry air moving across the actuator at high speeds. If the actuator and disc assembly are not adequately grounded, an electrostatic charge will build up, eventually dissipating through a circuit of the disc drive. The electrostatic charge may be of a magnitude large enough to destroy the circuit and also the disc drive. To prevent an electrostatic buildup, the material of E-block must be electrically conductive to properly ground the E-block assembly.

A need exists for a process which can be applied to E-blocks made from a material, such as aluminum, which is currently being used and supplied in the disc drive industry. Using current materials keeps the price of the components low and also assures that there are no new manufacturing wrinkles that need to be worked out in order to receive E-blocks from vendors. There is also a need for a process which allows easy, low cost manufacture of the E-block. There is a further need for an E-block assembly capable of exceeding current performance levels. The need is for a stiffer E-block that has a lower inertia. There is a need for an E-block that will require less torque and power to drive during seek operations. There is also a need for an E-block with improved settle time and access time within a disk drive. There is still a further need for an E-block which dissipates static charge and which will not produce particles within the disc drive.

SUMMARY OF THE INVENTION

A disc drive, includes a base, a disc stack rotatably attached to the base, and an actuator assembly movably attached to the base. The actuator assembly includes an E-block. The E-block for a disc drive includes a metal core and a ceramic coating on the metal core of the E-block. The ceramic coating on the metal core of the E-block is less dense than the metal core. The stiffness of the ceramic coating on the metal core of the E-block is greater than the stiffness of the metal core. In one embodiment, the E-block has a metal core of aluminum. The ceramic coating is may be formed using any method, including an electrochemical process or by depositing the ceramic coating onto the E-block.

Also disclosed are methods for fabricating an E-block for a disc drive includes the steps of providing a metal E-block and forming a ceramic coating on the E-block. The ceramic coating can be formed using any number of techniques including electrochemical techniques as well as by depositing a ceramic coating onto an E-block.

Advantageously, the method and apparatus described for forming an E-block or comb assembly can be applied to E-blocks made from a commonly used material, aluminum, which is currently being used and supplied in the disc drive industry. As a result, a ready supply of E-blocks or comb assemblies is available which keeps the price of the components low and also assures that there are no new manufacturing wrinkles for manufacturing the unprocessed E-block part. The process allows easy, low cost manufacture of the E-block assembly capable of exceeding current performance levels. The resulting E-block stiffer and has a lower inertia than an E-block made from pure aluminum. As a result, less torque and power are needed to drive the E-block or comb assembly during seek operations. The resulting E-block also has improved settle time over an aluminum E-block. The E-block also has improved access times than a comparable E-block made substantially entirely aluminum. The E-block dissipates static charge and the ceramic coating over the E-block prevents particle generation within the disc drive.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
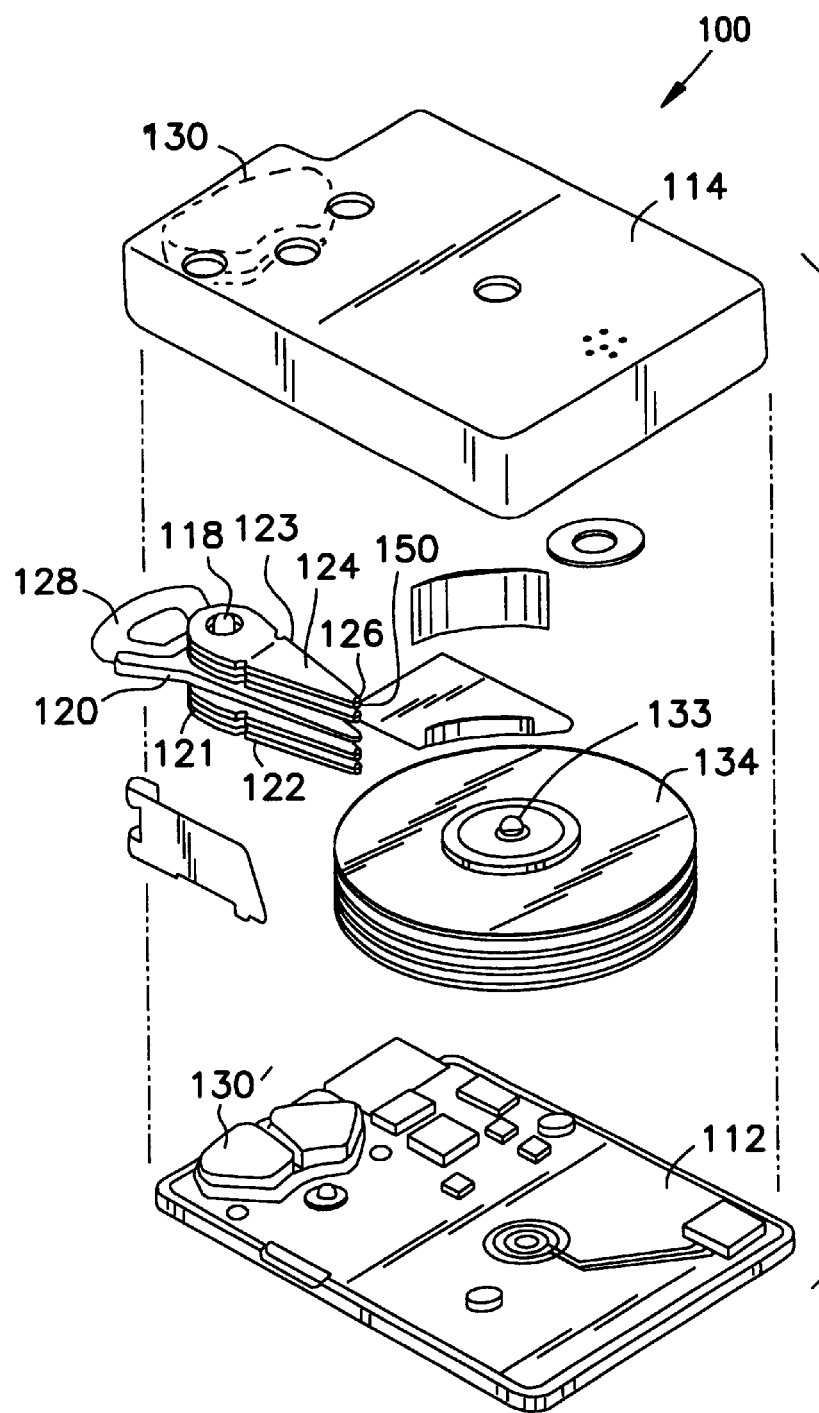
FIG. 1 is an exploded view of a disc drive with a multiple disc stack.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure or E-block 121 having a plurality of arms 123. For the sake of clarity, it should be pointed out that the E-block 121 is the portion of the actuator assembly 122 to which other components are attached. Attached to the separate arms 123 on the comb or E-block 121, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR (magneto resistive) head or GMR (giant magneto resistive) head in which one transducer 150 is generally used for reading and another is generally used for writing. On the end of the comb or E-block 121 of the actuator arm assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
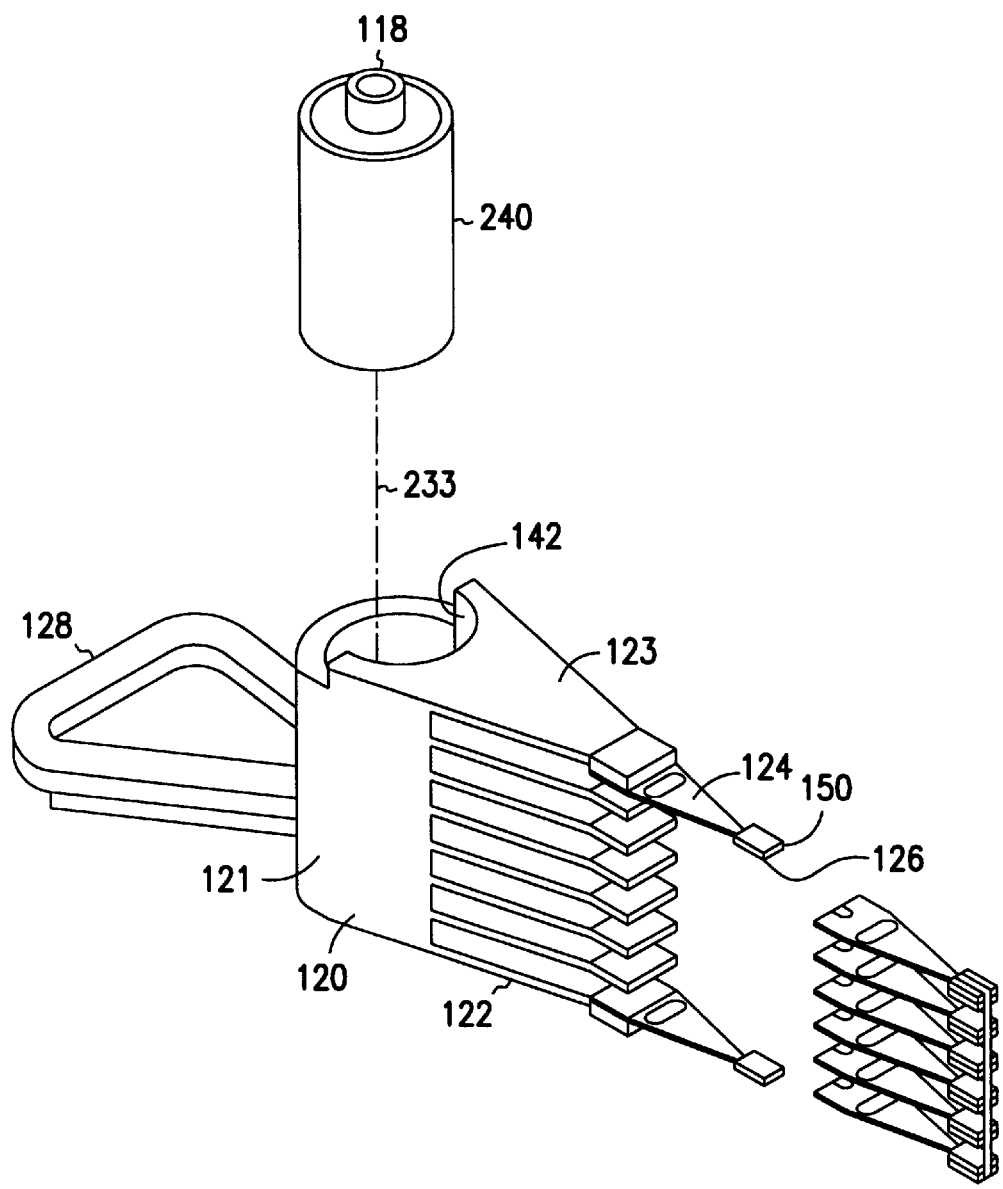
FIG. 2 is an exploded view of the actuator bearing cartridge and the actuator arm assembly of a disc drive.

FIG. 2 details the actuator arm assembly 120 in an exploded view. Each of the arms 123 of the E-block or comb assembly 121, except the arms 123 on the top and bottom of the E-block 121, carry two load springs. In this particular disc drive 100, there is a slider for both the top and bottom fingers of the E-block 121 have only one load spring 124 since these are used for the top surface of the top disc and the bottom surface of the bottom disc in the stack of disks 134. Attached to the load springs 124 are sliders 126 which include magnetic transducers 150 (also known as heads) which magnetize the surface of the disc 134 to represent and store desired data. As is well known in the art of disc drives, each of the discs has a series of concentric tracks onto which the magnetic information is recorded. The sliders 126 and the magnetic transducers incorporated therein are moved over the surface of a particular disc 134 so that a magnetic representation of data can be stored in any of the tracks on the disc 134. In this particular disc drive 100, the transducer movement is rotational and about the actuator shaft 118. Rotating the actuator arm assembly 120 causes the slider 126 and the transducer therein to be repositioned over surface of the disc 134.

FIG. 2 also shows that the actuator arm assembly 120 includes a bearing cartridge 240. The pivot cartridge is cylindrical in shape and includes the actuator shaft 118 about which the actuator arm assembly rotates. The actuator arm assembly 120 has a first opening or bore 242 therein. The bearing cartridge 240 fits within the bore 242 in the E-block 121 of the actuator arm assembly 120. The bore 242 has an axis 233.

Figure 3:
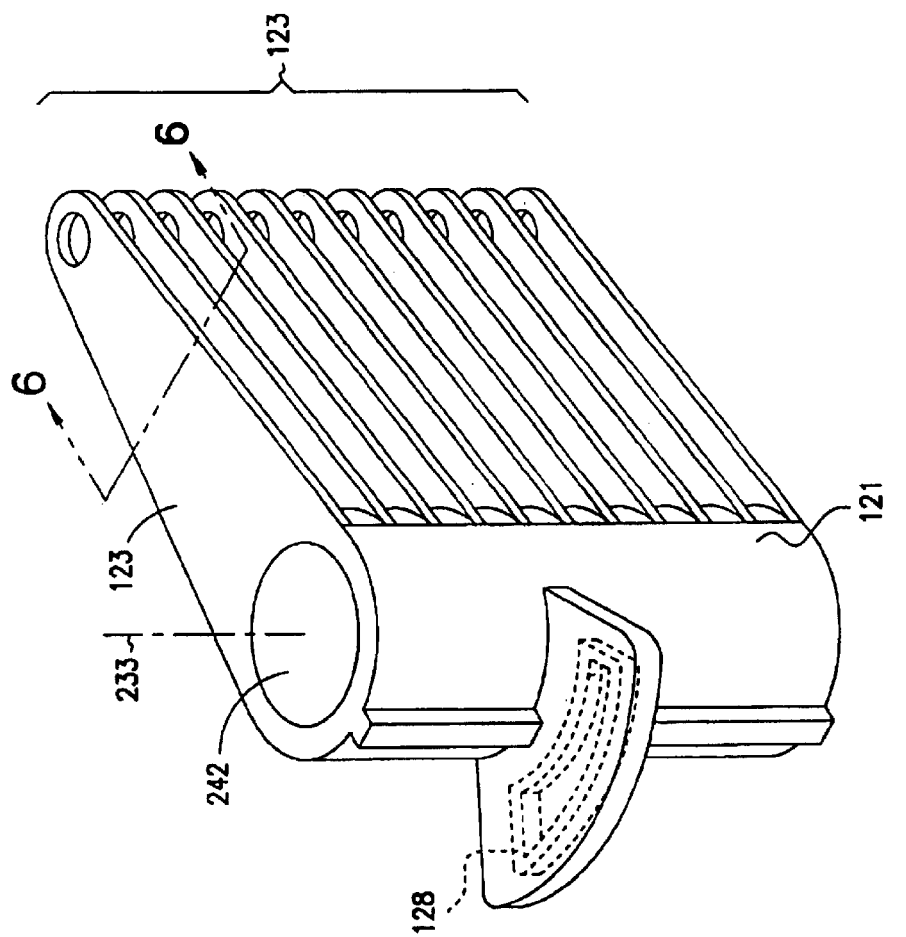
FIG. 3 is an isometric view of the unitary comb or E-block of this invention.
Figure 4:
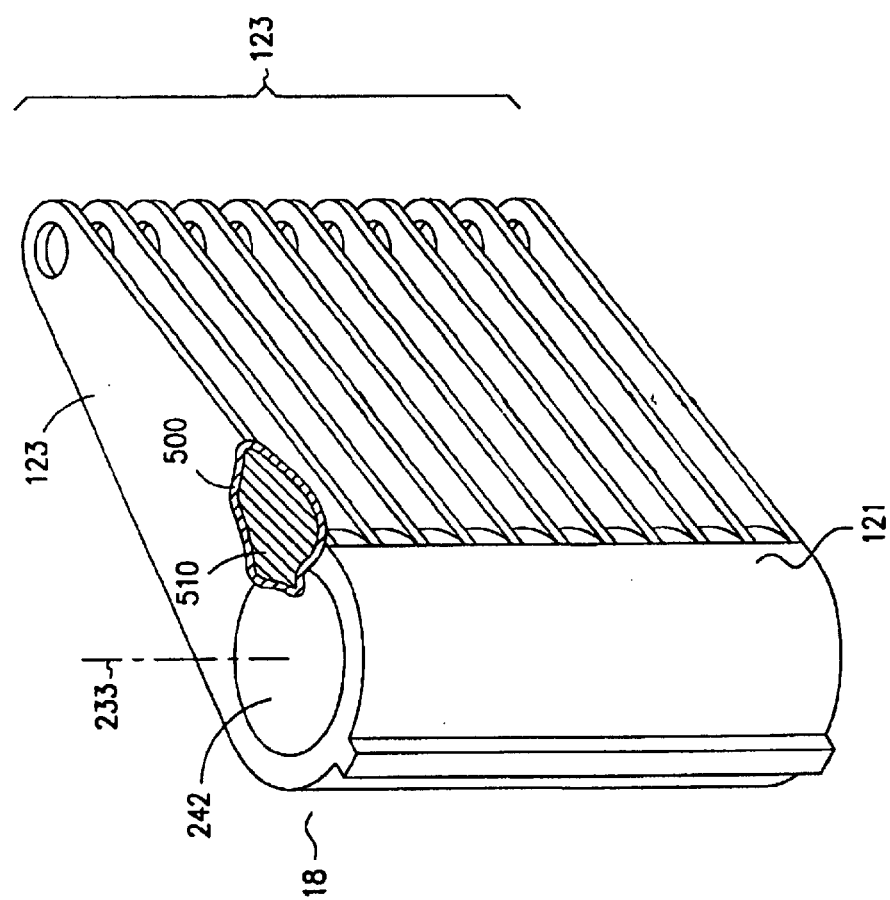
FIG. 4 is an isometric view of the unitary comb or E-block having a partial cut away section showing the inner core and the ceramic outer covering.

FIGS. 3 and 4 are an isometric view of the unitary comb or E-block 121 of this invention. Specifically, FIG. 4 is an isometric view of the unitary comb or E-block 121 having a partial cut away section showing the inner core 500 and a ceramic outer covering 510. FIGS. 3 and 4 show the unitary comb or E-block 121. It should again be pointed out that the actuator assembly 122 is the unitary comb or E-block 121 populated with the load beams or load springs 124, with attached sliders 126 and transducers 150, and the coil 128 of the voice coil motor 128, 130, 131. Aluminum forms the inner core 500 of the E-block 121. The ceramic coating or covering 510 is formed from or over the inner core 500. The ceramic covering 510 generally is less dense than the inner core 500 of the E-block 121. The ceramic covering 510 also is stiffer than the inner core 510. Since the covering 510 is less dense the inertia of the E-block 121 and the resulting actuator assembly 122 the torque necessary to move the actuator is less since the torque is related to the inertia times the angular acceleration by the following formula:

$$T=(J)\times(\alpha)$$

where

T=torque

J=inertia of the E-block or comb assembly $\alpha$=angular acceleration of the E-block or comb assembly From the above formula, it can be seen that reducing the inertia of the E-block or comb assembly results in a lower torque requirement to achieve the same angular acceleration. Lower torque also means less power consumption. In addition, since the covering of the E-block 121 is more stiff, the settle times associated with seeks will be less than an uncoated E-block 121.

Figure 5:
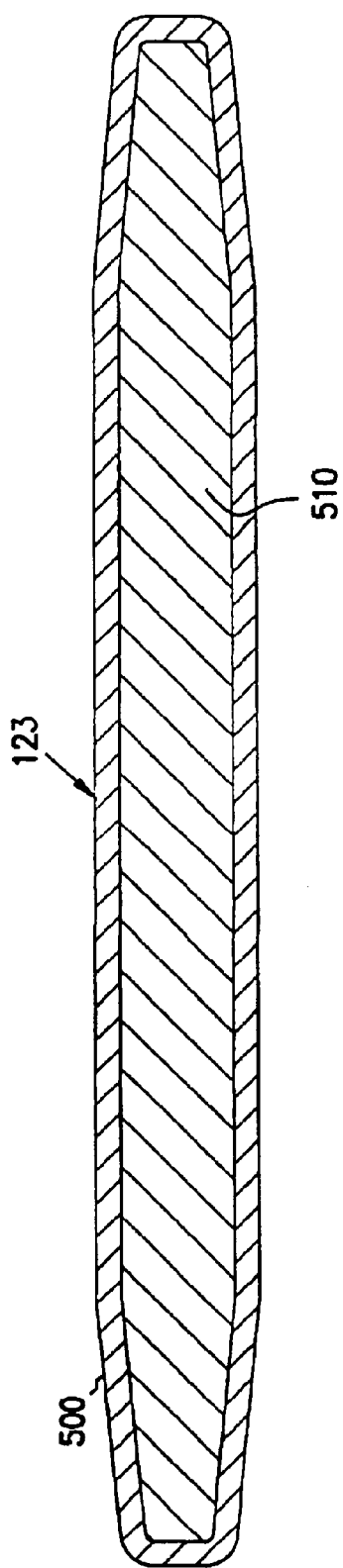
FIG. 5 is a section view along cut line 5—5 in FIG. 4 through an arm of the E-block showing the inner core and the ceramic outer skin or covering.

Referring to FIGS. 3–5, the unitary E-block 121 is made up of a solid metallic core 500, with a solid non-porous ceramic coating 510 which completely surrounds the core 500. FIG. 5 is a section view along cut line 5—5 in FIG. 4. The section view is through one of the arms 123 showing the inner core 500 and the ceramic outer covering 510. The arm 123, like the remaining portion of the E-block 121, is made up of the inner core 500, with a solid ceramic skin or covering 510 completely surrounding the inner core 500. The inner core 500 is made of a cast metal such as aluminum, beryllium, or magnesium or similar light metal. The inner core 500 can also be alloys containing aluminum, beryllium or magnesium.

There are several methods for forming a cover or skin 510 of ceramic on a metal core 510 of the E-block 121. The methods include electrochemical processes as well as depositing a ceramic onto the surface of the E-block 500 using common techniques related to semiconductor chip fabrication including sputtering, E-beam deposition, or vacuum deposition.

EXAMPLE 1

In one preferred embodiment, the core 500 is formed of aluminum. The ceramic skin or covering 510 of 0.0025–0.0040 inch is formed by an electrochemical process which removes a portion of the aluminum or aluminum alloy from the E-block 121 and converts that to a ceramic coating known as AlMag. AlMag is three times as stiff as aluminum and also is 0.95 times less dense. The end result is a lighter and stiffer E-block 121.

The process for forming AlMag on the aluminum or aluminum alloy 121 is now described. Initially the E-block is machined and washed. The process for forming a ceramic coating on the aluminum or aluminum alloy E-block 500 includes the steps of (a) immersing the metal as an electrode in an electrolytic bath comprising water and a solution of an alkali metal hydroxide; (b) providing an opposite electrode immersed in or containing the electrolyte liquid; (c) passing a modified shaped-wave alternate electric current from a high voltage source of at least 700 V through a surface of the metal to be coated and the opposite electrode, thereby causing dielectric breakdown, heating, melting, and thermal compacting of a hydroxide film formed on the surface of the metal to form and weld a ceramic coating thereto, and (d) changing the composition of the electrolyte while the ceramic coating is being formed, the change being effected by adding an oxyacid salt of an alkali metal. In a preferred embodiment, the modified shaped-wave electric current rises from zero to its maximum height and falls to below 40% of its maximum height within less than a quarter of a full alternating cycle.

The process may be used to form a ceramic coating on aluminum, zirconium, titanium, and hafnium. The process is also suited to alloys of these metals, provided the total of all alloying elements does not constitute more than approximately 20% of the whole. Process parameters may be optimized to suit the particular metal being coated and the particular properties of the coating considered important to a specific application.

The metal workpiece to be coated is connected as the electrode of an electrolytic bath and is immersed therein.

For coating aluminum, electrolytic bath comprising an aqueous solution of an alkali metal hydroxide. In an embodiment of the bath where it is required to optimize the coating to provide maximum adhesion between the metal and its coating, the electrolyte consists essentially of an aqueous solution containing between 0.5 to 2 g/liter of sodium hydroxide or potassium hydroxide. Fine particles of various substances are added if it is required to improve the special, for example, low friction, properties of the coating. Where such particles are added, the electrolyte is agitated to keep the particles in suspension. Similarly, colored coatings are produced by adding fine particles of pigmenting substances.

The preferred opposite electrode for the process is a stainless steel bath containing the electrolyte liquid. Where it is preferred to hold the electrolyte in a non-conducting container, for example, for safety considerations, the electrode from iron, nickel or stainless steel is inserted into the bath in the conventional manner.

A modified shaped-wave alternate electric current from a high voltage source of at least 700 V, typically 800 V for aluminum workpieces, is then passed between the metal workpiece and the other electrode. This results in dielectric breakdown, heating, melting and thermal compacting of a hydroxide film formed on the surface of the metal to form and weld a ceramic coating thereto. The arc microwelding is visible during coating. A convenient and moderate-cost method of obtaining the required shaped-wave electric pulse current is by use of a capacitor bank connected in series between the high voltage source from 800 to 1,000 V and said metal workpiece which is being coated.

Figure 6:
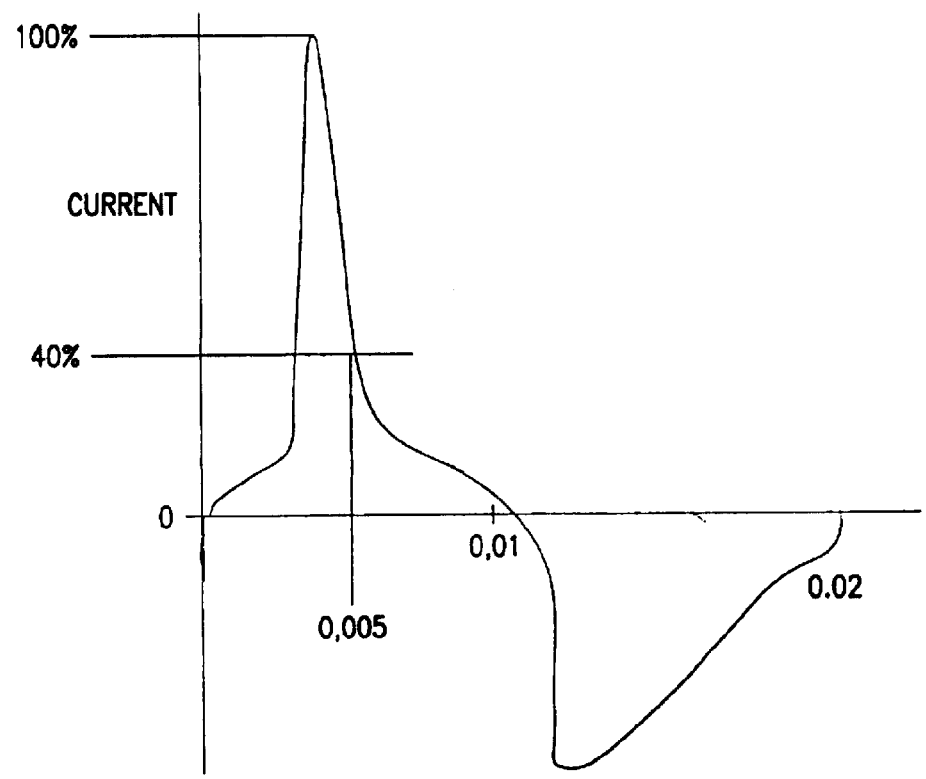
FIG. 6 shows a preferred type of shaped wave pulse.

Referring now to FIG. 6, there is seen a wave form of preferred shape of current. The effect of using alternating current in combination with a high voltage is to prolong the life of the microarc, which causes intense, local, temporary heating, and as a result, the welding and melting of the coating being formed on the submerged metal workpiece. Anodizing is effected during the first positive half-cycle, the metal workpiece being the positive electrode. Thereafter, the dielectric coating already formed fails dielectrically, thereby starting the generation of microarcs. Arc lifetime extends almost to the end of the first half-cycle. Burning of arc is repeated during the second half-cycle, when the workpiece becomes the negative electrode.

Figure 7:
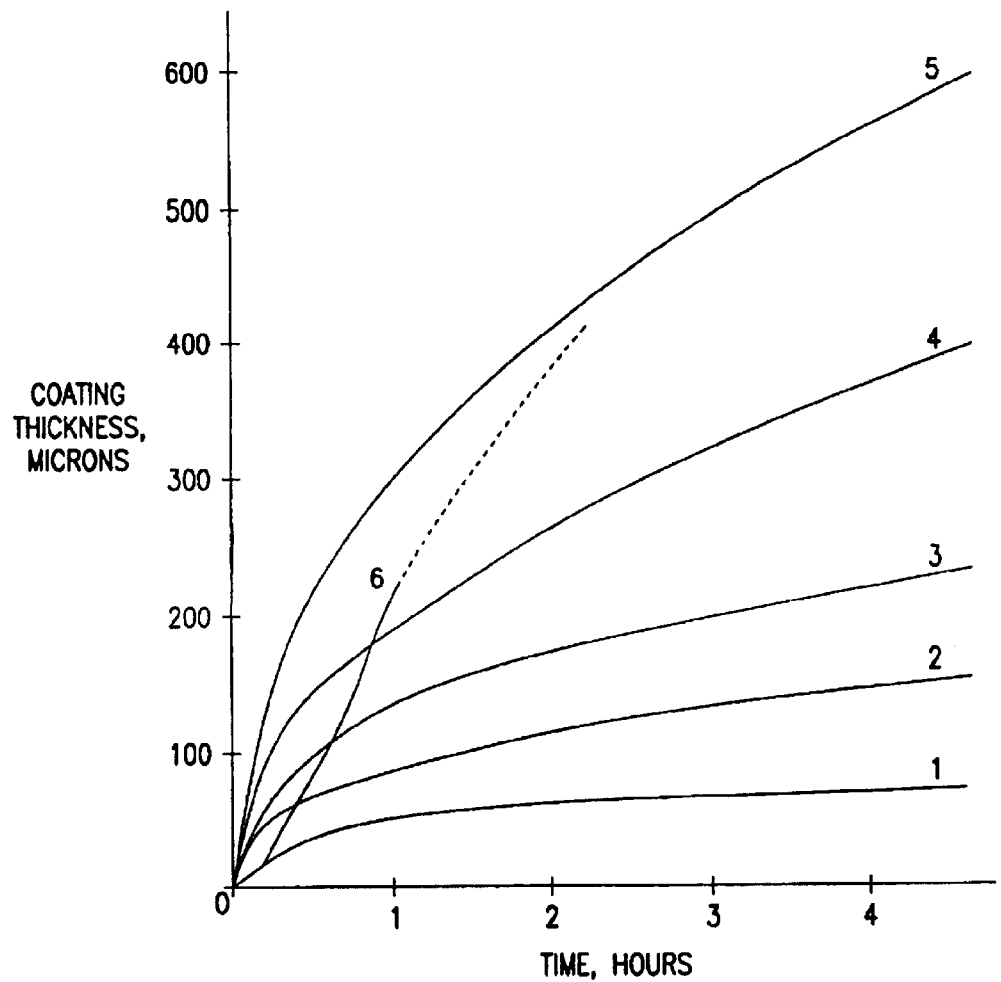
FIG. 7 depicts the relationship between coating thickness and electrolysis time.

Referring now to FIG. 7, there are seen time/coating thickness relationships for processes wherein electrolyte composition is held constant, designated traces 1 to 5. Trace 1 refers to a process wherein the electrolyte is pure potassium hydroxide. Traces 2 to 5 refer to processes wherein increasing concentrations of sodium tetrasilicate were used.

Trace 6 refers to the process of the present invention. It has been found that much faster coating is made possible by changing the composition of the electrolyte while the ceramic coating is being formed. The change effected comprises adding to the electrolyte a salt containing a cation of an alkali metal and an oxyacidic anion of an element. Said element is selected from the group comprising B, Al, Si, Ge, Sn, Pb, As, Sb, Bi, Se, Te, P, Ti, Zr, V, Nb, Ta, Cr, Mo, W, Mn and Fe, said salt being added in a concentration of between 2 and 200 g/liter of solution. A preferred element is silicon, and a preferred added salt is sodium tetrasilicate.

As is seen in the graph, changing of the electrolyte composition during operation allows production of a 200-micron thick coating in approximately 50 minutes, indicating a film formation velocity of 4 microns/minute. Tests have shown that this fast film formation is achieved without sacrificing the quality of film adhesion to the metal workpiece.

Obviously, once the added salt has been mixed into the electrolyte, the only practical way of again reducing salt concentration for coating the next batch of metal articles is to add considerable quantities of new electrolyte liquid. This problem is solved, as shown by the preferred embodiment of the present invention, the details of which are presented hereinafter in Table 2.

It has also been found that it is possible to produce a pore-free coating by gradual reduction of the current flow when the film has almost reached its desired thickness. In practice, this is effected by progressively reducing the capacitance used to shape the wave form, thus weakening the current until the process stops.

As will be realized from the above description, the term "modified" as used herein refers to the fact that the wave form is other than the standard sinusoidal form normally associated with a wave of alternating current and is instead modified, e.g., as illustrated in FIG. 6, to optimize the coating effect.

Reference is now made to Table 1, which lists various types of coatings for different requirements. Examples are listed of aluminum alloys which have been ceramically coated to achieve various design requirements.

TABLE 1

| Example No. | Functional Requirement | Thickness Microns | Hardness (Vickers) kgf/mm$^2$ | Porosity Pores/cm$^2$ | Notes |
|---|---|---|---|---|---|
| 1 | Undercoat for paint enamel or Teflon coat | 5–30 | 1800–2800 | 50–30 | Intentional high porosity. |
| 2 | Decorative coating | 10–50 | 1000–2400 | <5 | Strong adherence. |
| 3 | Corrosion protection | 30–150 | 1000–2300 | <1 | |
| 4 | Electric insulation | 10–250 | 1000–2300 | <1 | F– |
| 5 | Spacecraft reentry heat shield tiles | 50–300 | 1000–2300 | not applicable | |
| 6 | Wear resistance | 40–100 | 1800–2800 | 5–10 | Undergoes machining before use. |

TABLE 2

| Item | Units | Value |
|---|---|---|
| Metal workpiece material | | Duralumin |
| Wave form production method | | Capacitors |
| Transformer output voltage | V | 800 |
| Current density | A/dm$^2$ | |
| Anodic | | 6.0 |
| Cathodic | | 6.3 |
| Electrolyte composition | gram/liter water | |
| First bath: Potassium hydroxide | | 0.5 |
| Second bath: | | |
| Potassium hydroxide | | 0.5 |
| Sodium tetrasiucate | | 4.0 |
| Third bath: | | |
| Potassium hydroxide | | 0.5 |
| Sodium tetasilicate | | 11.0 |
| Coating time | minutes | |
| in first bath | | 10 |
| in second bath | | 10 |
| in third bath | | 20 |
| Total coating thickness | microns | 100 |
| Average deposition rate | microns/minute | 2.5 |
| Thickness of inner layer fully melted during coating | microns | 65 |
| Substrate adhesion | MPa | 380 |
| Micro Hardness | Vickers kgf/mm$^2$ | 2790 |
| Average Composition of layer: | % | |
| Corrundum | | 62 |
| Alumina | | 8 |
| Alumosilicate | | 30 |
| Coating porosity | No. or pores/cm$^2$ | 4–6 |
| Pore diameter | microns | 8–11 |

The invention also provides a ceramically-coated metal article produced by the described process. One example of such an article is an aluminum alloy piston for an internal combustion engine. A second example is an aluminum engine block for an internal combustion engine, intended to operate with minimal lubrication. A third example is a protective tile for spacecraft, designed to survive re-entry into the atmosphere. A fourth example is electric insulation serving also as a heat sink of an electronic board.

EXAMPLE 2

A ceramic film can be formed on the surface of a metal by performing spark discharge in an electrolytic bath, wherein the electrolytic bath comprises an aqueous solution of a water soluble or colloidal silicate and/or an oxyacid salt to which ceramics fine particles and/or specific fine particles are dispersed. The electrolytic bath used in the present invention is a dispersion comprising an aqueous solution containing a water-soluble or colloidal silicate and/or at least one oxyacid salt selected from the group consisting of tungstates, stannates, molybdates, borates, aluminates, phosphates or the like, to which fine particles of ceramics are dispersed. To the electrolytic bath, there may be added metal ions such as Ni, Co, Zn, Ca, Ba, Mg, Pb or Cr ions or mixture thereof in the form of a water-soluble salt. Examples of the silicates are a variety of water-soluble ones represented by the general formula: $M_2O \cdot nSiO_2$ (wherein M represents an alkali metal and n is a positive number ranging from 0.5 to 100) such as sodium silicate, potassium silicate, lithium silicate and those capable of being dispersed in water such as colloidal silica. These silicates may be use alone or in combination.

The concentration of the silicate and/or the oxyacid salt in the aqueous solution used as the electrolytic bath in the invention is preferably not less than 5 g/l and more preferably 25 to 200 g/l, respectively. In particular, if an oxyacid salt is used in an amount almost equal to its saturation, the highest film-forming velocity can be achieved, but the resulting film is often non-uniform as the concentration thereof increases. For this reason, the concentration thereof is desirably limited to the range defined above. The pH value of the electrolytic bath is not particularly limited, but preferably ranges from 3 to 13.5.

In the first aspect of the invention, various kinds of fine particles which are insoluble in the aqueous solution and capable of being dispersed therein can be used as the ceramic fine particles to be added to the aqueous solution. Specific examples thereof include oxide type ceramic such as $Al_2O_3$, $Al(OH)_3$, $SiO_2$, $3Al_2O_3$, $2SiO_2$, $TiO_2$, $ZrO_2$ and $Cr_2O_3$ and non-oxide type ceramics such as SiC, TiC, TiN, TiB, ZrB, BN, WC, $WSi_2$ and $MoSi_2$. These ceramic particles may be used alone or in combination.

The particle size of the ceramic particles desirably ranges from 0.03 to 100 $\mu$m, in particular 0.03 to 20 $\mu$m. That is, when the particle size thereof is increased, it is difficult to co-deposit the ceramic particles and if they are co-deposited the resulting film is non-uniform.

The amount of the fine particles of ceramic to be added to the electrolytic bath can be arbitrarily determined depending on the kinds of the electrolytes in which the fine particles are dispersed and the amount of the fine particles to be dispersed, but is in general up to 200 g/l and most preferably ranges from 5 to 100 g/l from the viewpoint of the efficiency of the deposition.

Examples of the fine particles used in the second aspect of the present invention are molybdenum disulfide, carbon, fluorinated graphite, tetrafluoroethylene resin or mixture thereof. Graphite is preferable as a carbon component used herein. These fine particles have self-lubricating properties, are hence taken in the ceramic film during the spark discharge to thus give a film having good wear resistance.

In this embodiment, the fine ceramic particles used in the first aspect of the invention can be used together with the fine particles having self-lubricating properties.

The particle size of the fine particles having self-lubricating properties desirably ranges from 0.01 to 100 $\mu$m and preferably 0.03 to 20 $\mu$m. That is, when the particle size thereof is increased, it is difficult to co-deposit the ceramic particles and if they are co-deposited the resulting film is non-uniform.

The amount of the fine particles having self-lubricating properties to be added to the electrolytic bath can be arbitrarily determined depending on the kinds of the electrolytes in which the fine particles are dispersed and the amount of the fine particles to be dispersed, but is in general up to 200 g/l and most preferably ranges from 5 to 100 g/l from the viewpoint of the efficiency of the deposition.

In the first and second aspects of the present invention, examples of the metal substrates on which a ceramic film can be formed by the spark discharge technique include those made from aluminum and alloys thereof; zirconium, titanium, niobium, magnesium and alloys thereof.

When a film is formed on a metal substrate by spark discharge, the substrate must not be subjected to a particular pretreatment, but it is desirable to sufficiently clean the surface of the substrate through degreasing, etching, washing with an acid or the like.

An insoluble electrode is used as a cathode and the cathode may be formed from, for instance, iron, stainless steel, nickel or the like.

In the method of the present invention, the spark discharge is carried out in the electrolytic bath defined above while ensuring the suspended state of the ceramic particles in the electrolytic bath. The ceramic fine particles sediment due to the gravitational action or the self-weight and thus it is important to conduct the spark discharge while maintaining the suspended state of the particles in the usual manner. The retention of such suspended state can be performed by stirring or circulation of the electrolyte.

When fine particles having poor dispersion properties are employed, there may be used a dispersant, for instance, a surfactant such as cationic, non-ionic or anionic ones for obtaining a good dispersion.

The temperature of the electrolytic bath during the spark discharge in general ranges from 5° to 90° C. and preferably 15° to 60° C. This is because, if it is too low, the film-forming velocity by the spark discharge is low, while if it is too high, it is liable to form a non-uniform film.

In addition, if the current density used is too low, the fine particles are hardly deposited, while if it is too high, a film having a low particle density or a coarse film is formed at high current portions. Therefore, the current density preferably ranges from 0.2 to 20 $A/dm^2$, more preferably 1 to 5 $A/dm^2$.

The output from a power supply may be a direct current having any wave form, but preferably those having pulse shape (rectangular wave form), saw-tooth wave form or DC half-wave form.

The spark discharge-initiating voltage varies depending on various factors such as the wave form of the output current from the dc power supply, the concentration of the silicate and that of the oxyacid salt and the temperature of the bath, but it desirably ranges from 50 to 200 V. Moreover, the voltage observed during the film formation is increased as the spark discharge proceeds and the final voltage sometimes exceeds 1,000 V.

The electrolysis time varies depending on the desired thickness of the resulting film. However, if the resulting film is thin, the film does not show the quality peculiar thereto. Therefore, the electrolysis must be performed for at least 5 minutes. In general, practically acceptable films having a thickness, for instance, ranging from 2 to 80 $\mu$m can be obtained if the electrolysis is performed for 10 to 60 minutes.

According to the first aspect of the present invention, there can effectively be prepared metallic materials having ceramic films having high insulating properties, high hardness and a variety of color tones.

Low outgassing properties, corrosion resistance and fastness properties can be imparted to an apparatus for manufacturing semiconductor devices by applying a ceramic film onto the shroud or the chamber of a reaction vessel of the apparatus according to the method of this invention.

According to the method of this invention, the color tone of the resulting films is rather white depending on the kinds of the fine particles used and, therefore, the method can also be useful as a whitening treatment for aluminum construction materials.

In addition, if a ceramic film is applied onto a heater of aluminum, a far infrared radiator having excellent far infrared emission properties and free of hit marks can be obtained.

The second aspect of the present invention makes it possible to effectively produce metallic materials having a ceramic composite layer thereon excellent in wear resistance.

Thus, if the composite film of the present invention is, for instance, applied onto sliding faces of movable portions in a vacuum vessel, an apparatus having excellent gas discharge properties, corrosion resistance and durability can be obtained. Moreover, if it is applied onto the sliding faces of movable portions of an apparatus, the apparatus operated at a high temperature is made heat resistant, corrosion resistant and durable.

Advantageously, the method and apparatus described for forming an E-block or comb assembly can be applied to E-blocks made from a commonly used material, aluminum or an aluminum alloy, which is currently being used and supplied in the disc drive industry. As a result, a ready supply of E-blocks or comb assemblies is available which keeps the price of the components low and also assures that there are no new manufacturing wrinkles for manufacturing the unprocessed E-block part. The process allows easy, low cost manufacture of the E-block assembly capable of exceeding current performance levels. The resulting E-block stiffer and has a lower inertia than an E-block made from pure aluminum. As a result, less torque and power are needed to drive the E-block or comb assembly during seek operations. The resulting E-block also has improved settle time over an aluminum E-block. The E-block also has improved access times than a comparable E-block made substantially entirely aluminum. The E-block dissipates static charge and the ceramic coating over the E-block prevents particle generation within the disc drive.

Figure 8:
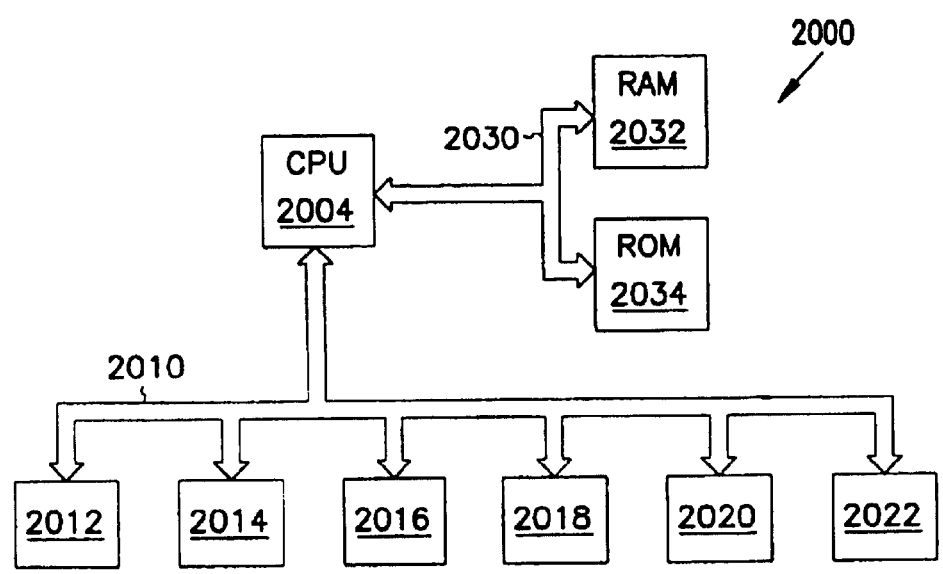
FIG. 8 is a schematic view of a computer system.

FIG. 8 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the E-block described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

Conclusion

In conclusion, an E-block 121 for a disc drive 100 includes a metal core 510 and a ceramic coating 500 on the metal core 510 of the E-block. The ceramic coating 500 on the metal core 510 of the E-block is less dense than the metal core 510. The stiffness of the ceramic coating 500 on the metal core 510 of the E-block 121 is greater than the stiffness of the metal core 510. In one embodiment, the E-block 121 has a metal core 510 of aluminum. The ceramic coating 500 on the metal core 510 of the E-block is less dense than aluminum. The stiffness of the ceramic coating 500 on the metal core 510 of the E-block is greater than the stiffness of aluminum. The density of the ceramic coating is less than the density of aluminum. The ceramic coating 500 is may be formed using an electrochemical process or may be formed by depositing the ceramic coating 500 onto the E-block 121.

A disc drive 100 includes a base 112, a disc 134 rotatably attached to the base 112, and an actuator assembly 120 rotatably attached to the base. The actuator assembly 120 has an opening therein. The actuator assembly 120 further includes an E-block 121 having an inner core 510 of metal and an outer skin 500 of ceramic. The E-block 121 has a voice coil attached thereto. The voice coil 128 forms a portion of a voice coil motor 128, 130, 131 for driving the actuator assembly. The E-block 121 includes a plurality of arms 123. The actuator assembly 120 has at least one transducer 150 attached to at least one of said plurality of arms 123. The metal core 510 of the E-block 121 is aluminum. The ceramic coating 500 on the aluminum core 510 of the E-block 121 is less dense than aluminum. In addition, the stiffness of the ceramic skin 500 on the aluminum core 510 of the E-block 121 is greater than the stiffness of aluminum.

A method for fabricating an E-block 121 for a disc drive 100 includes the steps of providing a metal E-block 121 and forming a ceramic coating 500 on the E-block 121. The ceramic coating 500 can be formed using any number of techniques.

An E-block 121 for a disc drive 100 includes a metal core 510, and coating 500 means on the metal core 510 of the E-block 121.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An E-block for a disc drive comprising:
   a solid metal core in the form of an E-block; and
   a ceramic coating on the metal core of the E-block.

2. The E-block for a disc drive of claim 1 wherein the ceramic coating on the metal core of the E-block is less dense than the metal core.

3. The E-block for a disc drive of claim 1 wherein the ceramic coating has a stiffness and wherein the metal core has a stiffness, the stiffness of the ceramic coating on the metal core of the E-block is greater than the stiffness of the metal core.

4. The E-block for a disc drive of claim 1 wherein the metal core is beryllium.

5. The E-block for a disc drive of claim 1 wherein the metal core is aluminum.

6. The E-block for a disc drive of claim 5 wherein the ceramic coating on the metal core of the E-block is less dense than the aluminum core.

7. The E-block for a disc drive of claim 5 the stiffness of the ceramic coating on the metal core of the E-block is greater than the stiffness of the aluminum core.

8. The E-block for a disc drive of claim 5 wherein the ceramic coating on the metal core of the E-block has a density less than the density of the aluminum core.

9. The E-block for a disc drive of claim 1 wherein the ceramic coating is formed using an electrochemical process.

10. The E-block for a disc drive of claim 1 wherein the ceramic coating is deposited on the E-block.

11. The E-block of claim 1 wherein the metal core is an alloy of aluminum.

12. The E-block of claim 1 wherein the metal core is an alloy of beryllium.

13. A disc drive comprising:
   a base;
   a disc rotatably attached to the base; and
   an actuator assembly rotatably attached to said base, said actuator assembly having an opening therein, said actuator assembly further including an E-block having an inner core of metal and an outer skin of ceramic.

14. The disc drive of claim 13 further comprising a coil attached to the E-block which forms a portion of a voice coil motor for driving the actuator assembly.

15. The disc drive of claim 13 wherein the E-block includes a plurality of arms, said actuator assembly further comprising at least one transducer attached to at least one of said plurality of arms.

16. The disc drive of claim 13 wherein the metal core of the E-block is aluminum.

17. The disc drive of claim 16 wherein the ceramic coating on the aluminum core of the E-block is less dense than the aluminum core.

18. The E-block for a disc drive of claim 16 the stiffness of the ceramic coating on the aluminum core of the E-block is greater than the stiffness of the aluminum core.

19. A method for fabricating an E-block for a disc drive comprising the steps of:
   providing a metal E-block; and
   forming a ceramic coating on the E-block.

20. An E-block for a disc drive comprising:
   a metal core; and
   coating means on the metal core of the E-block.

\* \* \* \* \*